March 19, 1946. P. E. PURCELL 2,396,880
PLUG VALVE
Filed July 3, 1944
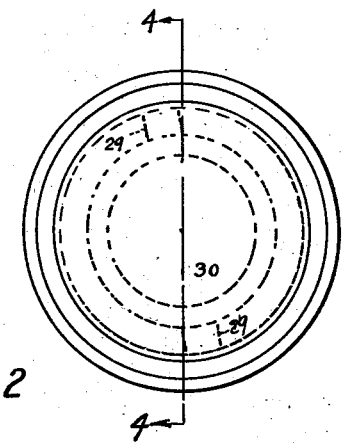
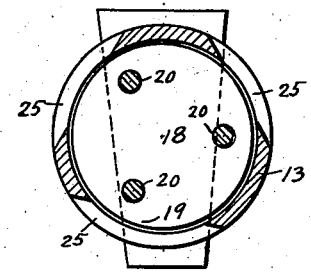
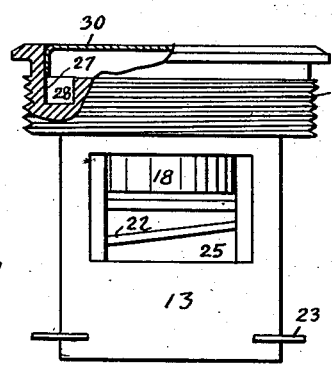
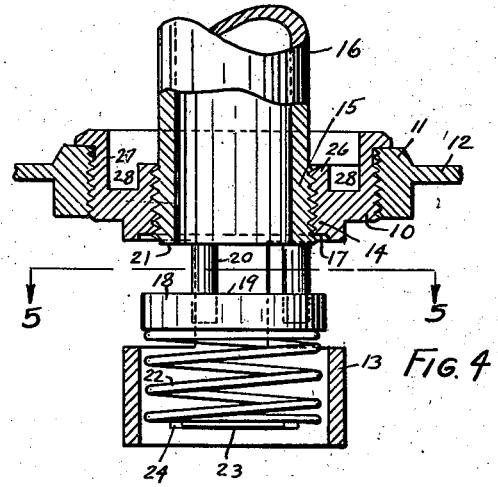
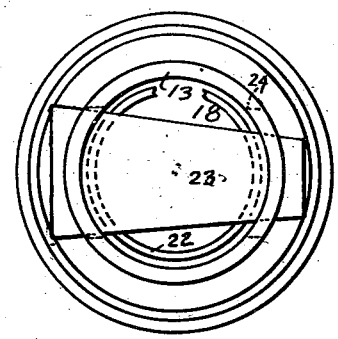
INVENTOR
P. E. PURCELL
BY
ATTORNEY Patented Mar. 19, 1946

2,396,880

UNITED STATES PATENT OFFICE 2,396,880

PLUG VALVE

Peter E. Purcell, Portland, Oreg.

Application July 3, 1944, Serial No. 543,335

1 Claim. (Cl. 284—18)

This invention relates generally to containers and particularly to a plug valve for use on containers in which fluids are stored, and from which they may be dispensed.

The main object of this invention is to provide a plug valve for oil drums and barrels in which a plug valve is provided for the opening thereof which will be opened when a faucet is inserted in the opening and which will close automatically when the faucet is withdrawn from the opening.

The second object is to eliminate waste commonly occurring at drum faucets due to the faucet being improperly closed or accidentally opened.

The third object is to provide a device of the class described which will be easy to manufacture and install, and have a minimum number of working parts.

I accomplish these and other objects in a manner set forth in the following specification as illustrated in the accompanying drawing, in which:

Fig. 1 is a side elevation of the valve, with a portion thereof broken away in vertical section to show the seal.

Fig. 2 is a plan of Fig. 1.

Fig. 3 is a bottom view of Fig. 1.

Fig. 4 is a vertical section taken along the line 4—4 in Fig. 2.

Fig. 5 is a transverse section taken along the line 5—5 in Fig. 4.

Similar numbers refer to similar parts throughout the several views.

Referring in detail to the drawing, there is shown a threaded plug 10 adapted to be threaded into the flange 11 of the drum 12. The plug 10 has formed on its under side a cylindrical body 13, at whose upper end is a threaded head 14 adapted to receive the threaded end 15 of the faucet 16. The under side 17 of the head 14 constitutes a seat for the slidable disc 18, whose upper side 19 is adapted to seat against the side 17 when the faucet 16 is not in position. The disc 18 is provided with a plurality of pins 20 adapted to engage the end 21 of the faucet 16 whereby the placing of the faucet 16 in position will tend to unseat the disc 18.

A spring 22 is placed against the under side of the disc 18 and is held in compression by the tapering plate 23, which passes through the slots 24 in the body 13. Openings 25 are formed in the sides of the body 13 to permit fluids to pass from the drum 12 to the faucet 16.

On the top side of the head 14 is formed a flange 26 between which and the counterbored inner surface 27 of the plug 10 is formed an annular groove 28, across which are disposed the two lugs 29, by means of which the plug 10 may be rotated.

An expendible sealing disc 30 is provided to close the valve against the withdrawal of the contents, and this seal is so constructed as to indicate clearly any tampering.

The operation of the device is as follows:

On desiring to draw a fluid from a sealed container equipped with one of these devices, it is first necessary to remove the seal 30 and insert the faucet 16 in the usual manner. This action causes the end 21 of the faucet 16 to engage the pins 20 and unseat the disc 19 and thereby permit the withdrawal of the fluid from the container in the usual manner. If the faucet 16 should be withdrawn for any reason, then the disc 18 is automatically moved to a closing position by means of the spring 22.

While I have thus illustrated and described my invention, it is not my desire to be limited to the precise form shown herein, and I intend to cover such forms and modifications of the invention as fall fairly within the appended claim.

I claim:

A plug valve for oil drums consisting of an internally and externally threaded plug, the outer threads being adapted to occupy the outlet opening of an oil drum, and the inner threads being adapted to receive the threaded end of a faucet, said plug having cylindrical recesses formed within the outer thread and a flange formed around the inner thread forming an annular space therebetween, said annular space having wrench engaging lugs disposed therein, a cylindrical body extending from said plug into the oil drum, said body having lateral openings adjacent to said plug, a valve disc slidably mounted on said cylinder having pins projecting therefrom into the internally threaded opening close to the threads thereof adapted to engage the end of a faucet occupying said internally threaded opening, said pins constituting spacers between said faucet and disc, a spring for urging said disc toward said faucet, said cylindrical body having transverse slots formed across the end thereof opposite its plug end, a tapering plate occupying said transverse slots and a spiral spring disposed between said tapering plate and said disc for the purpose of urging said disc toward said plug and faucet.

PETER E. PURCELL.